(12) United States Patent  (10) Patent No.: US 6,508,287 B1
Shinozaki et al.  (45) Date of Patent: Jan. 21, 2003

(54) ADHESIVE TAPE APPLICATOR FOR THE DOOR SASH FRAME OF AN AUTOMOBILE

(75) Inventors: Mitsuhiko Shinozaki, Mino (JP); Hisashi Ando, Toyota (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 10 days.

(21) Appl. No.: 09/697,366

(22) Filed: Oct. 26, 2000

(30) Foreign Application Priority Data

Oct. 26, 1999 (JP) .......................................... 11-304395

(51) Int. Cl.$^7$ ............................................. B32B 31/00
(52) U.S. Cl. ...................... 156/391; 156/486; 156/540; 156/574; 156/579
(58) Field of Search ................................ 156/574, 579, 156/391, 540, 486, 475, 543

(56) References Cited

U.S. PATENT DOCUMENTS 3,818,744 A * 6/1974 Sayer .......................... 72/250
4,234,371 A * 11/1980 Christman ............... 152/209.1
5,888,621 A * 3/1999 Frohlich et al. ............ 156/207
6,098,685 A * 8/2000 Maeda ........................ 156/391

FOREIGN PATENT DOCUMENTS

| JP | 5-338627 | 12/1993 |
| JP | 7-242364 | 9/1995 |
| JP | 9-132218 | 5/1997 |
| JP | 2000-118322 | 4/2000 |

* cited by examiner

Primary Examiner—Richard Crispino
Assistant Examiner—Cheryl N. Hawkins
(74) Attorney, Agent, or Firm—Knobbe, Martens Olson & Bear LLP

(57) ABSTRACT

An adhesive tape applicator of the present invention comprises a first holding piece 2 and a second holding piece 3 for holding a door sash frame therebetween, the first holding piece 2 having at least one elastic rollers 5 for pressing the adhesive tape against an object face of the door sash frame, the second holding piece 3 having at least one guide rollers 6 being provided on the opposite side to the object face of the door sash frame, the guide rollers 6 having a groove 6a engaging with a rib 6 extending in the longitudinal direction of the door sash frame. The adhesive tape applicator is capable of applying the adhesive tape to the door sash frame of an automobile stably and accurately, and further provides an adhesive tape applicator which is capable of applying the adhesive tape with improved operability and speedily.

10 Claims, 4 Drawing Sheets

ADHESIVE TAPE APPLICATOR FOR THE DOOR SASH FRAME OF AN AUTOMOBILE

TECHNICAL FIELD

The present invention relates to an adhesive tape applicator for applying an adhesive tape to door sash frames of automobiles.

BACKGROUND ART

Conventionally, pillars and door sash frames of the automobile have been painted in black or other colors in order to improve their appearance. However, painting requires additional manufacturing steps such as masking. Painting has also been causing environmental problems of evaporated solvents in the atmosphere.

In recent years, in order to solve such problems, adhesive tapes made of vinyl chloride and coated with an adhesive have been generally applied to door sash frames and the like. As shown in FIG. 7, an adhesive tape T comprises a base material TB having an adhesive layer TS on one side, and a release liner TL covering the adhesive layer TS. As shown in FIG. 7, the base material TB may be provided thereon with a transparent protective layer TP on the side of the base material opposite to the adhesive layer, if necessary. The base material TB is painted in black or other colors.

However, the recent automobile designs include greatly curved door sash frames. Moreover, in some cases, parts of the door sash frames are narrowed because of the process of curving the frames. When an adhesive tape is applied to the door sash frames using an adhesive tape applicator, conventional adhesive tape applicators can not be moved smoothly along the curves or waving portions and the like. Thus, the adhesive tape may be deviated from the door sash frames.

In addition, although the application of adhesive tapes to door sash frames is carried out in assembly line, conventional adhesive tape applicators require considerable time for positioning and setting the applicator on the door sash frames.

Therefore, an adhesive tape applicator which is capable of improving the appearance, manufacturing efficiency and quality of the door sash frames of the automobile is desired.

DISCLOSURE OF INVENTION

An object of the present invention is to solve the foregoing problems of the prior art by providing an adhesive tape applicator which is capable of an applying adhesive tape stably and accurately with a high speed; and realizing improved operability.

The above object of the present invention can be achieved by an adhesive tape applicator which is moved along a door sash frame of an automobile and releases a release liner from the adhesive tape assembly as the adhesive tape applicator is moved, the adhesive tape applicator comprising a first holding piece and a second holding piece which hold the door sash frame therebetween, the first holding piece having a pressing portion for pressing the adhesive tape against an object face of the door sash frame, the second holding piece comprising at least one guide roller each having a groove engageable with a rib provided on the opposite side to the object face of the door sash frame and extending in the longitudinal direction of the door sash frame.

It is preferable that the first holding piece and the second holding piece are connected by a common pivot pin in such a manner that both holding pieces are pivotable; a resilient member is disposed between the first holding piece and the second holding piece to urge said both pieces to come close to each other; and wherein at least one of the first holding piece and the second holding piece has a lever for moving the piece away from the other piece against the force of the resilient member.

It is preferable that the first holding piece comprises at least one elastic roller having the pressing portion.

It is preferable that the first holding piece comprises an adhesive-tape guide means for leading the adhesive tape to the pressing portion separately from the release liner, the adhesive-tape guide means comprises a turning portion for reversing a transfer path of the adhesive tape and transferring the adhesive tape to the pressing portion, a lateral guide for controlling the widthwise potion of the adhesive tape to be transferred to the turning portion, a face guide for controlling the position in the direction of the thickness of the adhesive tape to be transferred to the turning portion, the face guide being swingable from a closed position to an opened position and reversely and resiliently forced in the closing direction.

The lateral guide is preferably provided in such a manner that the position of the lateral guide is adjustable in the widthwise direction of the adhesive tape assembly.

The second holding piece preferably has at least one auxiliary roller which is capable of contacting a portion to which weather strips are attached, the portion projecting and extending on the inner side of the door sash frame.

DESCRIPTION OF THE PREFERRED EMBODIMENT

Preferred embodiments of the adhesive tape applicator of the present invention (hereinafter referred to as "applicator") are described below referring to the attached drawings.

Figure 2:
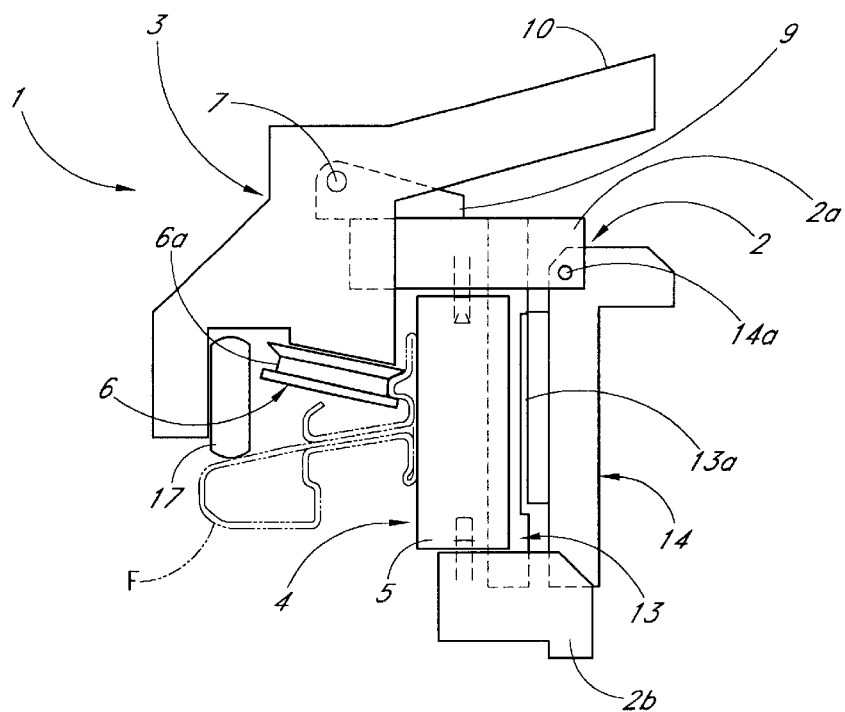
FIG. 2 is a front view of the adhesive tape applicator shown in FIG. 1.
Figure 3:
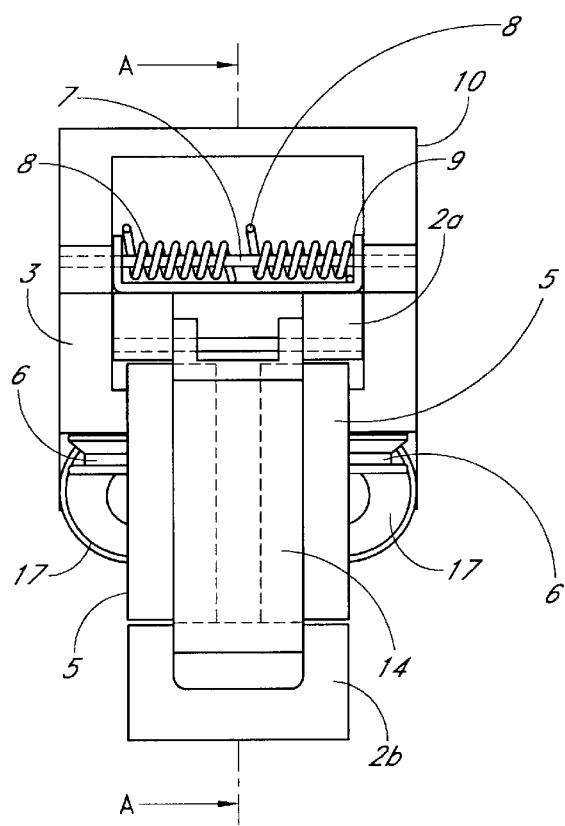
FIG. 3 is a right side view of the adhesive tape applicator shown in FIG. 1.
Figure 6:
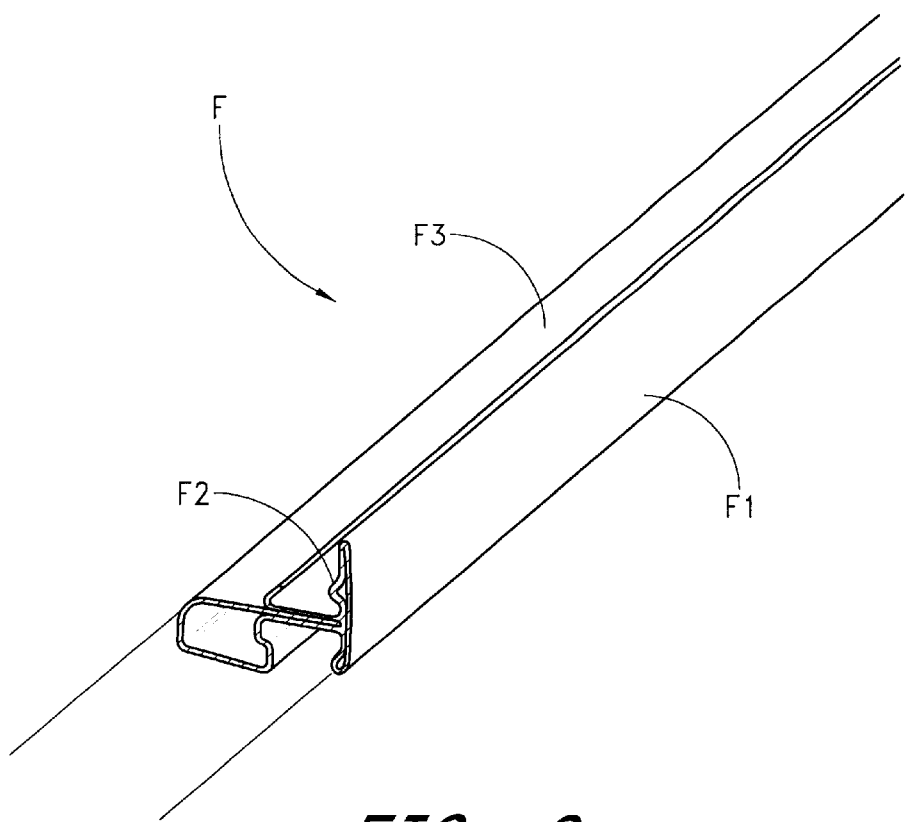
FIG. 6 is a perspective view showing a door sash frame partially in section.
Figure 7:
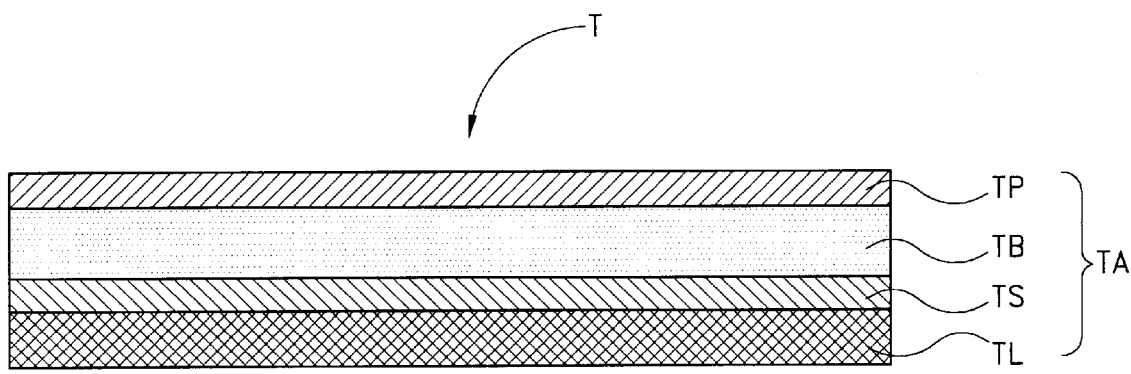
FIG. 7 is an enlarged sectional view of an adhesive tape.

The door sash frame F on which the adhesive tape is applied by the applicator of the invention has sectional configurations as shown in FIG. 2 and FIG. 6. The door sash frame F comprises an outer face F1 to which an adhesive tape TA is applied and a rib F2 which is projecting from the opposite side of the face F1 and extending in the longitudinal direction of the door sash frame F.

Figure 1:
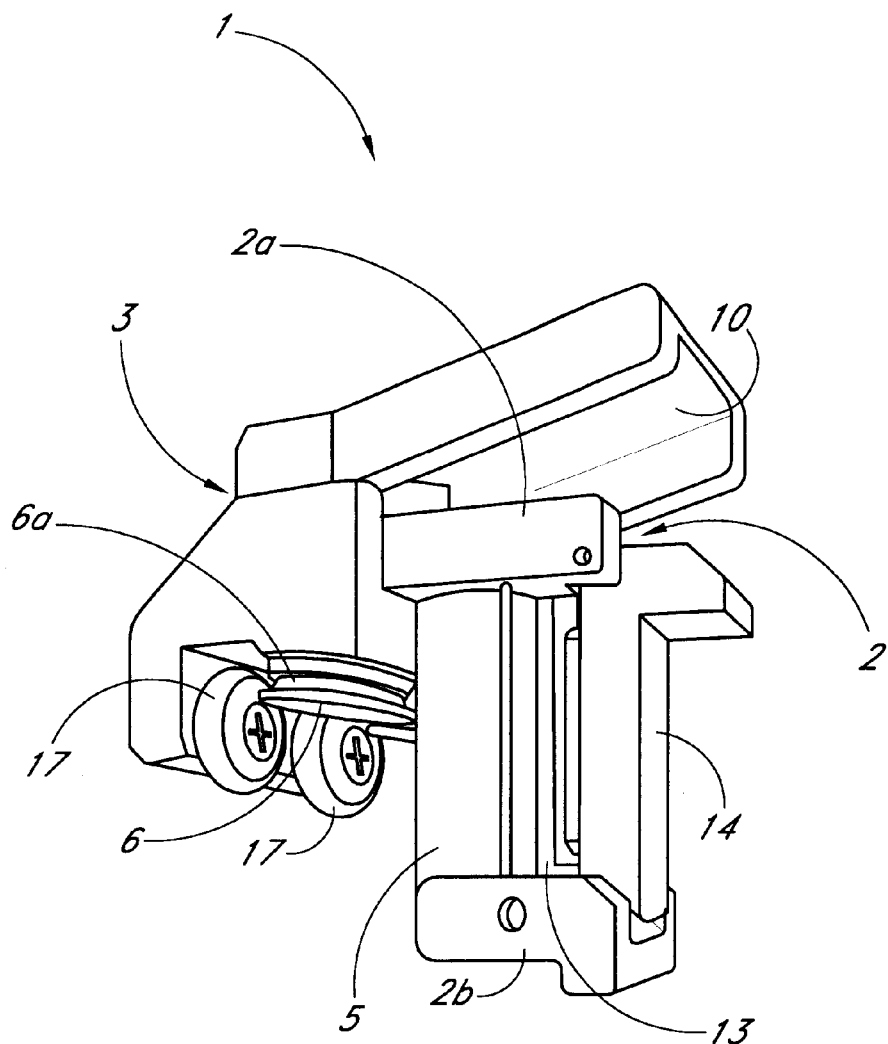
FIG. 1 is a perspective view showing an embodiment of an adhesive tape applicator of the present invention.
Figure 4:
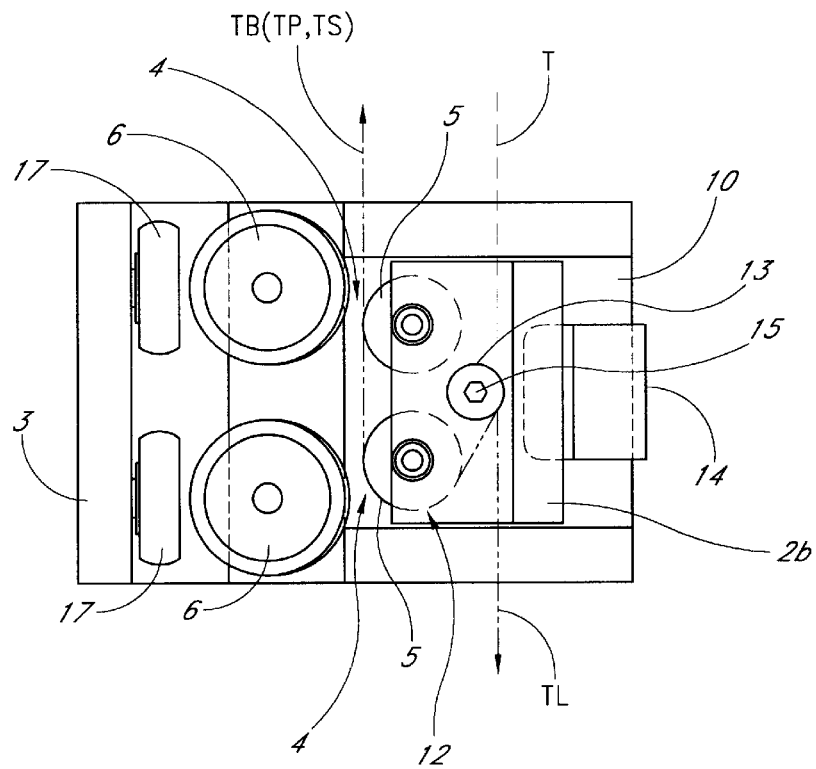
FIG. 4 is a bottom view of the adhesive tape applicator shown in FIG. 1.

As shown in FIG. 1 and FIG. 2, the applicator 1 comprises the first holding piece 2 and the second holding piece 3 for pinching the door sash frame F therebetween. As shown in FIG. 4, an elastic rollers 5 is rotatably supported on the first holding piece 2. A pressing portion 4 of the elastic rollers 5 presses the adhesive tape against the face F1. On the second holding piece 3 is rotatably supported a guide rollers 6. A groove 6a on the guide rollers 6 engages the rib F2. The elastic rollers 5 can be produced using a sponge-like rubber formed into a cylinder.

Figure 5:
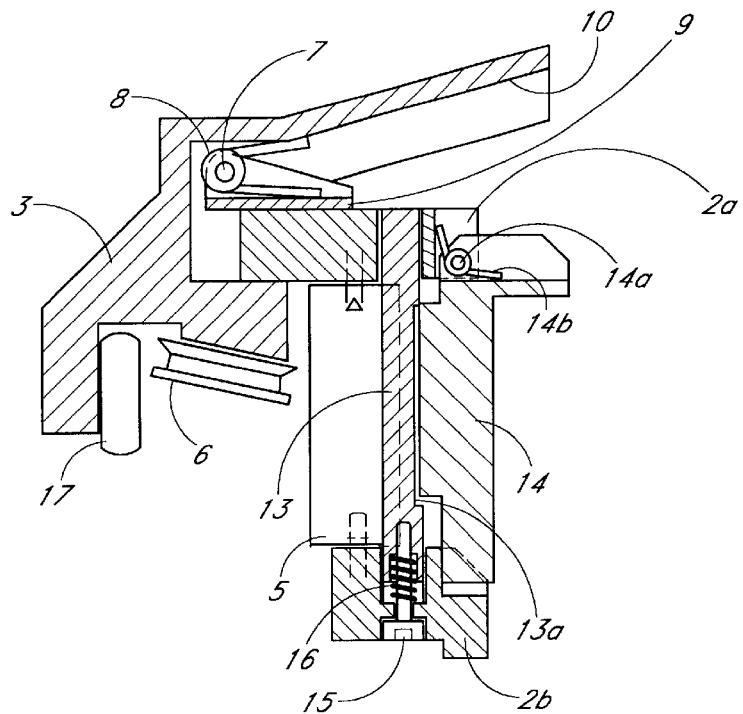
FIG. 5 is a sectional view taken along line A—A of FIG. 3.

To hold the door sash frame F between the elastic rollers 5 and the guide rollers 6, the first holding piece 2 and the second holding piece 3 are connected by a pivot pin 7 in such a manner that the first holding piece and the second holding piece can be opened and closed. Further, as shown in FIG. 5, the pivot pin 7 is equipped with a resilient member comprising a torsion coil spring 8. The first holding piece 2 and the second holding piece 3 are forced in the closing direction by the resilient member. Therefore, the elastic rollers 5 and the guide rollers 6 are urged to move closed to each other. In this embodiment, the pivot pin 7 is supported on a bearing 9 fixed on the first holding piece 2. Moreover, as shown in FIG. 5, one end of the torsion coil spring 8 pushes the upper side of the first holding piece 2. The other end of the torsion coil spring 8 pushes the inner side of a lever 10 which is integrally and fixedly mounted on the second holding piece 3.

In this embodiment, two guide rollers 6 and two elastic rollers 5 are disposed facing each other. This arrangement improves the travelling stability of the applicator 1.

The first holding piece preferably comprises an adhesive-tape guide means. The adhesive-tape guide means releases the release liner TL from the adhesive tape assembly T and leads the adhesive tape TA to the pressing portion 4 simultaneously. In addition, the adhesive-tape guide means transfers the adhesive tape TA around the elastic rollers 5. Therefore, the adhesive-tape guide means forms a turning portion 12, as shown in FIG. 4. The adhesive tape TA is reversely turned by the turning portion 12. Moreover, as shown in FIG. 5, the adhesive-tape guide means has a lateral guide 13 for controlling the widthwise position of the adhesive tape assembly T in the course of the adhesive tape assembly T before it is reversely turned, and a face guide 14 for controlling the position in the direction of the thickness of the adhesive tape assembly T.

The position of the lateral guide 13 is preferably adjustable in the widthwise direction of the adhesive tape assembly, i.e., the axial direction of the elastic rollers 5 (vertical direction in FIG. 5). In the example shown in FIG. 5, the lateral guide 13 is disposed between two elastic rollers 5 and is slidably supported by an upper bearing member 2a of the elastic rollers 5 and a lower bearing member 2b of the elastic rollers 5 in the vertical direction of FIG. 5. The position of the guide 13 is adjustable by an adjusting screw 15 screwed into the guide 13 through the lower bearing member 2b.

More specifically, the lateral guide 13 has a bar-shape and is provided with a groove 13a on its side in which the adhesive tape assembly T is placed. The adjusting screw 15 is screwed into the lower end of the lateral guide 13 through a coil spring 16. This coil spring 16 is inserted into a vertical groove formed on the lower bearing 2b, and pushes the lateral guide 13 upward and the adjusting screw 15 in FIG. 5. By rotating the adjusting screw 15 clockwise or counterclockwise, the position of the lateral guide 13 is adjusted in the vertical direction in the FIG. 5.

The face guide 14 has a swingable mechanism. In this embodiment, the face guide 14 has an inverted L shape when seen from the side of the application. The bent portion of the reversed L shape of the face guide 14 is rotatably supported by a pivot pin 14a on the upper bearing member 2a. A torsion coil spring 14b fitted onto the pivot pin 14a pushes the face guide 14 in a closing direction.

The force of the torsion spring brings the lower end of the face guide 14 into contact with the lower bearing member 2b. By pushing the shorter side of the inverted L shape against the resilient force of the torsion coil spring 14b, the face guide 14 is opened.

A groove 13a formed in the lateral guide 13 has a depth which is substantially greater than the thickness of the adhesive tape assembly T. Therefore, the friction between the adhesive tape assembly T and the inner face of the face guide 14 or the bottom of the groove on the lateral guide 13 is reduced. For this reason, when the adhesive tape assembly T is transferred, unwanted tension does not act on the adhesive tape assembly T. Although not shown in FIGS., the inner face of the face guide 14 may be provided with a groove in which the adhesive tape assembly T is placed and this groove may be used as a face guide.

It is preferable that the second holding piece 3 further comprises an auxiliary roller 17. The auxiliary roller 17 is capable of contacting with a portion F3 to which weather strips are attached. The portion F3 projects from the inner side of the door sash frame F. The auxiliary roller 17 prevents wobbling of the applicator 1 on the door sash frame F. Hence, when the adhesive tape is applied to the door sash frame F, the applicator 1 is stabilized.

The applicator 1 having the above structure is used in a manner described below. The adhesive tape assembly T used in the following application is the same as or similar to conventionally known tapes.

First, an operator opens the face guide 14, places the adhesive tape assembly T into the lateral guide 13, and closes the face guide 14. By these operations, the position of the adhesive tape assembly T relative to the elastic roller 5 is fixed. Then, the adhesive tape assembly T is placed into the lateral guide 13 with the release liner side being opposite to the elastic roller 5, that is, the release liner facing outward.

Then, the operator turns the end portion of the adhesive tape assembly T around the turning portion 12 and transfers the end portion of the adhesive tape T to the pressing portion 4. Before the transfer, the front end of the release liner TL is released from the adhesive tape T over a short length only. This operation prevents the release liner TL from turning around the elastic roller 5 and allows the release liner TL to separate from the base material TB because of its own rigidity, as shown in FIG. 4. Thus, the release liner TL of the adhesive tape assembly T is released and only the adhesive tape TA is transferred to the pressing portion 4. Consequently, the adhesive layer TS on the base material TB faces the door sash frame F.

In this state, the operator operates the lever 10 to open the first holding piece 2 and the second holding piece 3, as shown in FIG. 2. By this operation, the guide rollers 6 are engaged with the rib F2 of the door sash frame F, and the door sash frame F is held between the guide rollers 6 and the elastic rollers 5. The pressing portion 4 of the elastic roller 5 presses the adhesive tape TA against the face F1 on the door sash frame F to adhere the adhesive tape TA on the face F1.

In this state, the operator moves the applicator 1 along the door sash frame F so that the adhesive tape TA is applied to the door sash frame F, while being separated from the release liner TL.

As mentioned in the above and shown in FIG. 2, by engaging the groove 6a with the rib F2, the applicator 1 is prevented from wobbling in the vertical direction relative to the door sash frame F. According to this applicator 1, other members to prevent such wobbling, for example, rollers which hold the door sash frame from up and down and the like (not shown), can be omitted. Therefore, the applicator 1 can be designed compactly.

The door sash frame F is formed by folding a long metal plate. The rib F2 has no welded portions and the like and its dimensional accuracy is remarkably high. Thus, the guide rollers 6 having the groove 6a is capable of determining the position for mounting the applicator 1 relative to the door sash frame F (mainly vertical direction in FIG. 2) with high accuracy.

Furthermore, the lever 10 is provided so that the first holding piece 2 and the second holding piece 3 can be easily opened and closed simply by operating the lever 10, enabling rapid operations.

Furthermore, since the applicator 1 employs the elastic rollers 5 formed with a sponge rubber or the like, the adhesive tape TA is not scratched. The elastic rollers 5 also reduces the friction between the adhesive tape TA at the curve portion of the door sash frame F and prevents wrinkles on the adhesive tape TA. Moreover, because the elastic rollers 5 changes its shape depending on the shape of the door sash frame with the application of small force, no air bubble is caught between the door sash frame F and the adhesive tape TA.

As apparent from the above description, according to the adhesive tape applicator of the present invention, the adhesive tape can be applied stably, accurately, with improved operability and speedily.

It is to be understood that the scope of present invention is not limited by the above Examples.

What is claimed is:

1. An adhesive tape applicator which is moved along a door sash frame of an automobile and releases a release liner from the adhesive tape assembly as the adhesive tape applicator is moved, the adhesive tape applicator comprising:

a first holding piece and a second holding piece which hold the door sash frame therebetween, the first holding piece having a pressing portion for pressing the adhesive tape against an object face of the door sash frame, the second holding piece comprising at least one guide roller each having a groove engageable with a rib provided on the opposite side to the object face of the door sash frame and extending in the longitudinal direction of the door sash frame, wherein the first holding piece and the second holding piece are connected by a common pivot pin in such a manner that both holding pieces are pivotable; a resilient member is disposed between the first holding piece and the second holding piece to urge said both holding pieces to come close to each other; and wherein at least one of the first holding piece and the second holding piece has a lever for moving the holding piece away from the other holding piece against the force of the resilient member.

2. An adhesive tape applicator according to claims 1, wherein the first holding piece comprises at least one elastic roller having the pressing portion.

3. An adhesive tape applicator according to claim 1, wherein the first holding piece comprises an adhesive-tape guide means for leading the adhesive tape to the pressing portion separately from the release liner, the adhesive-tape guide means comprises a turning portion for reversing a transfer path of the adhesive tape and transferring the adhesive tape to the pressing portion, a lateral guide for controlling the widthwise portion of the adhesive tape to be transferred to the turning portion, a face guide for controlling the position in the direction of the thickness of the adhesive tape to be transferred to the turning portion, the face guide being swingable from a closed position to an opened position and reversely and resiliently forced the closing direction.

4. An adhesive tape applicator according to claim 3, wherein the lateral guide is provided in such a manner that the position of the lateral guide is adjustable in the widthwise direction of the adhesive tape assembly.

5. An adhesive tape applicator according to claim 1, wherein the second holding piece has at least one auxiliary roller which is capable of contacting a portion to which weather strips are attached, the portion projecting and extending on the inner side of the door sash frame.

6. An adhesive tape applicator according to claim 2, wherein the second holding piece has at least one auxiliary roller which is capable of contacting a portion to which weather strips are attached, the portion projecting and extending on the inner side of the door sash frame.

7. An adhesive tape applicator according to claim 3, wherein the second holding piece has at least one auxiliary roller which is capable of contacting a portion to which weather strips are attached, the portion projecting and extending on the inner side of the door sash frame.

8. An adhesive tape applicator according to claim 4, wherein the second holding piece has at least one auxiliary roller which is capable of contacting a portion to which weather strips are attached, the portion projecting and extending on the inner side of the door sash frame.

9. An adhesive tape applicator which is moved along a door sash frame of an automobile and releases a release liner from the adhesive tape assembly as the adhesive tape applicator is moved, the adhesive tape applicator comprising:

a first holding piece and a second holding piece which hold the door sash frame therebetween, the first holding piece having a pressing portion for pressing the adhesive tape against an object face of the door sash frame, the second holding piece comprising at least one guide roller each having a groove engageable with a rib provided on the opposite side to the object face of the door sash frame and extending in the longitudinal direction of the door sash frame, wherein the first holding piece comprises an adhesive-tape guide means for leading the adhesive tape to the pressing portion separately from the release liner, the adhesive-tape guide means comprises a turning portion for reversing a transfer path of the adhesive tape and transferring the adhesive tape to the pressing portion, a lateral guide for controlling the widthwise portion of the adhesive tape to be transferred to the turning portion, a face guide for controlling the position in the direction of the thickness of the adhesive tape to be transferred to the turning portion, the face guide being swingable from a closed position to an opened position and reversely and resiliently forced in the closing direction, the lateral guide being provided in such a manner that the position of the lateral guide is adjustable in the widthwise direction of the adhesive tape assembly.

10. An adhesive tape applicator according to claim 9, wherein the second holding piece has at least one auxiliary roller which is capable of contacting a portion to which weather strips are attached, the portion projecting and extending on the inner side of the door sash frame.

* * * * *